US005287128A

United States Patent [19]

Doane et al.

[11] Patent Number: 5,287,128

[45] Date of Patent: Feb. 15, 1994

[54] METHOD TO MANUFACTURE MULTIPLE PART IMAGED DOCUMENTS

[75] Inventors: Ivan G. Doane, Erie; Franklin L. Burket, Grand Island, both of N.Y.

[73] Assignee: Moore Business Forms, Inc., Grand Island, N.Y.

[21] Appl. No.: 936,339

[22] Filed: Aug. 28, 1992

[51] Int. Cl.[5] ........................ G01D 15/06; B65D 27/10

[52] U.S. Cl. ........................................ 346/159; 229/69; 462/55; 346/1.1

[58] Field of Search .................... 346/1.1, 159; 462/55; 229/69

[56] References Cited

U.S. PATENT DOCUMENTS

| | | | |
|---|---|---|---|
| 3,983,815 | 10/1976 | Borelli | 101/426 |
| 4,311,325 | 1/1982 | Steidinger | 229/69 X |
| 4,772,049 | 9/1988 | Engle | 462/55 X |
| 4,938,505 | 7/1990 | Gruttemeyer et al. | 462/18 |
| 4,955,640 | 9/1990 | Anderson | 281/2 |
| 4,963,941 | 10/1990 | Negishi et al. | 355/282 |
| 5,108,346 | 4/1992 | Ashby | 229/69 X |
| 5,118,030 | 6/1992 | McNamara et al. | 229/69 |

*Primary Examiner*—George H. Miller, Jr.
*Attorney, Agent, or Firm*—Nixon & Vanderhye

[57] ABSTRACT

Multiple part documents in which each part has common non-variable information and variable information are produced at high speed with a minimum amount of equipment. Utilizing either sequential press technology or large diameter plates, the multiple parts of the document are sequentially printed on a single web with the non-variable information. The variable information is sequentially printed on the same web in a procedure distinct from the printing of the non-variable information, typically utilizing a single ion deposition printer for each face of the web. The parts are separated and intelligently gathered and then the parts are sealed together to form a document, along one edge, by applying glue, or pressure seal adhesive. After sealing the documents may be rotated and delivered to a carrier web. Alternatively, an outer wrapper or envelope, variably imaged by another ion deposition print engine, may be provided around the multiple part documents after sealing.

20 Claims, 2 Drawing Sheets

METHOD TO MANUFACTURE MULTIPLE PART IMAGED DOCUMENTS

BACKGROUND AND SUMMARY OF THE INVENTION

Imaged multiple part documents, such as courier service airbills having bar coding thereon, are difficult to efficiently manufacture. If the forms are six part, normal press running requires six separate plates, make-ready, and runs. To variable image these documents, an ion deposition printer may be used for imaging roll to roll, and then the parts are collated. The process can be enhanced by providing multiple ion deposition print engines on a collator, however this requires as many ion deposition print engines as parts of the form, which is a substantial capital investment and adversely affects productivity.

According to the present invention, imaged multi-part documents, such as bar coded airbills, may be produced in an efficient manner at high speed (e.g. over 400 feet per minute), and high throughput. Also, by the practice of the present invention a complete document can be manufactured in a one-pass operation, requiring only one setup and run, substantially reducing setup time.

According to one aspect of the present invention, a method of producing multiple part documents, each part having common non-variable information, and at least some parts having common variable information (such as a bar coding) is provided. The method comprises the following steps: (a) On a continuous web, sequentially printing each part of the multiple part document with common non-variable information. (b) On the continuous web, sequentially printing variable information on the multiple parts in a procedure distinct from step (a). Then (c) separating and intelligently gathering the parts of the multiple part document. And then (d) sealing the multiple parts of each document together along one edge thereof.

Step (b) is preferably practiced by ion deposition printing, and both faces of the web can be printed with variable information by a single ion deposition print engine each. The steps are preferably practiced in the order of (b), (a), (c), and (d). Step (a) is practiced utilizing a large diameter plate, having a circumference at least as great as the width or length of a part times the number of parts, or by sequential press technology. Step (d) may be practiced by applying strips of pressure seal adhesive to a common edge of a plurality of the parts of each multiple part document, aligning the adhesive strip edges, and applying pressure to the parts only at the adhesive strips.

There may be the further steps, after step (d), of rotating the documents roughly 90 degrees, and delivering the documents to a carrier web to be carried thereby. Alternatively, there may be the further steps of (e), immediately after step (d), providing an outer wrapper or an envelope around the multiple part documents, and (f) prior to step (e), variably imaging the outer wrapper or envelope with an ion deposition print engine. The method may be practiced at a speed of at least 400 fpm.

According to another aspect of the present invention, a printing system for printing multiple part documents having common non-variable information, and variable information, is provided. This system comprises: Web unwinding means for unwinding a paper web having first and second faces. A single variably imaging print engine for the first face of the web for variably imaging the web after it is unwound by the unwinding means. Means distinct from the variably imaging print engine for sequentially printing on the web first face each part of the multiple part document with non-variable information. Means for separating and intelligently gathering the parts of the multiple part document. And means for sealing the multiple parts of each document together along one edge thereof.

Typically the variable imaging print engine (or engines if another is provided for the second face of the web) are ion deposition print engines. The sequential printing means comprises a printing press having a large diameter plate, or sequential printing technology. The ion deposition print engine is disposed between the unwinding means (which may be a sonic unwinder), and the sequential printing means. Another ion deposition print engine may be provided for printing an outer wrapper or envelope to be provided around the document downstream of the sealing means. The sealing means may be a pressure sealer or a glue application system.

It is a primary object of the present invention to provide for the efficient, high speed, and easy setup and running production, of multiple part business forms having non-variable information on all parts, and variable information (such as bar coding) on at least some of the parts. This and other objects of the invention will become clear from an inspection of the detailed description of the invention, and from the appended claims.

DETAILED DESCRIPTION OF THE DRAWINGS

Figures 1, 2, 3:
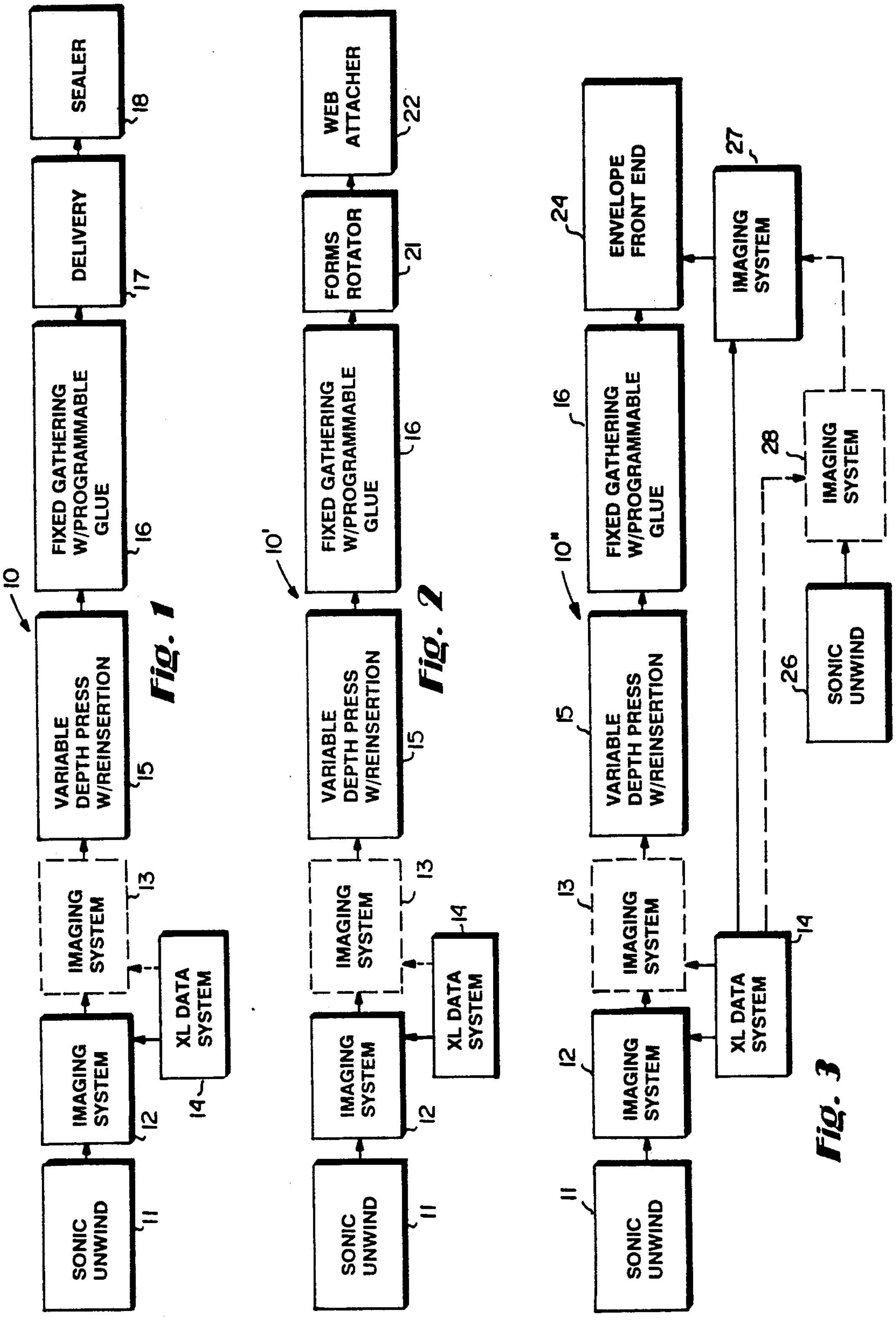
FIGS. 1 through 3 are schematics illustrating exemplary systems utilizable in the practice of the present invention.

FIG. 1 illustrates an exemplary apparatus utilizable in an exemplary system 10 according to the present invention. In this embodiment, the first component of the system comprises a web unwinding means 11, such as a sonic unwind. A web (not shown), having first and second faces (typically oriented so that they are the top and bottom faces), is unwound from the web. According to the invention an imaging system 12 for variably imaging information (e.g. bar coding) on the first face of the web is provided. A substantially identical imaging system 13 may optionally be provided for the second face. The imaging systems 12, 13 may comprise a wide variety of variable imaging systems, but preferably are ion deposition print engines. Ion deposition printing is described in "Ion Printing, Past, Present and Future" by Richard A. Fotland of Dennison Manufacturing Company, the IGC Conference on Ion Deposition Printing, Mar. 29-31, 1987.

A single print engine 12, 13 is used for each of the faces of the web, thereby providing a minimum amount of equipment. The particular ion deposition print engines utilized may be MIDAX printers. They are controlled by a computer control system 14, such as a XL Data System of Moore Business Forms, Inc. of Lake Forest, Illinois and Grand Island, N.Y.

Normally, although not essentially, the print engines 12, 13 are provided upstream of a variable depth press 15 with reinsertion. Such a press 15 comprises means for sequentially printing on the web first face each part of the multiple part document with non-variable information. The press 15 may be a Toppan Moore TMSW20V, or a Sanden Model 851, or the like, which typically has a final cut-off cylinder which is synchronized with the plates of the press. Since the press 15 will be sequentially printing on the web first face, preferably large diameter printing plates are utilized. That is, each plate (and typically only one plate per multi-part document would be utilized) has a circumference at least equal to the width or length of each of the multi-part form, times the number of parts. For example, if there is a five-part form with each part having a length of 8.5 inches, for a total repeat of 42.5 inches, the cylinder will have a circumference of about 42.5 inches. If a four-part form with each part having a length of 7 inches is printed, the cylinder will have a circumference of about 28 inches.

Downstream of the sequential printing press 15 are means for separately and intelligently gathering the parts of the multi-part document, and means for sealing the multiple parts of each document together along one edge. In FIG. 1, the means for separating and intelligently gathering the parts are illustrated by reference numeral 16. The sealing means may be directly associated therewith, such as if glue is utilized, or the parts may be merely stacked and forwarded to delivery station 17, and thereafter fed to a sealer 18, such as a Moore Business Forms Pressure Sealer. The fixed gathering apparatus 16, with or without programmable glue, and the pressure sealer 18, are conventional.

While the system illustrated in FIG. 1 is preferred, under some circumstances the imaging systems 12, 13 may image the parts sequentially in a roll to sheet operation, rather than directly in line on the press as illustrated in FIG. 1.

Note that by utilizing the system of FIG. 1, only one setup for each multi-part document need be provided, even if the document has as many as five, six, or more parts.

Figure 4:
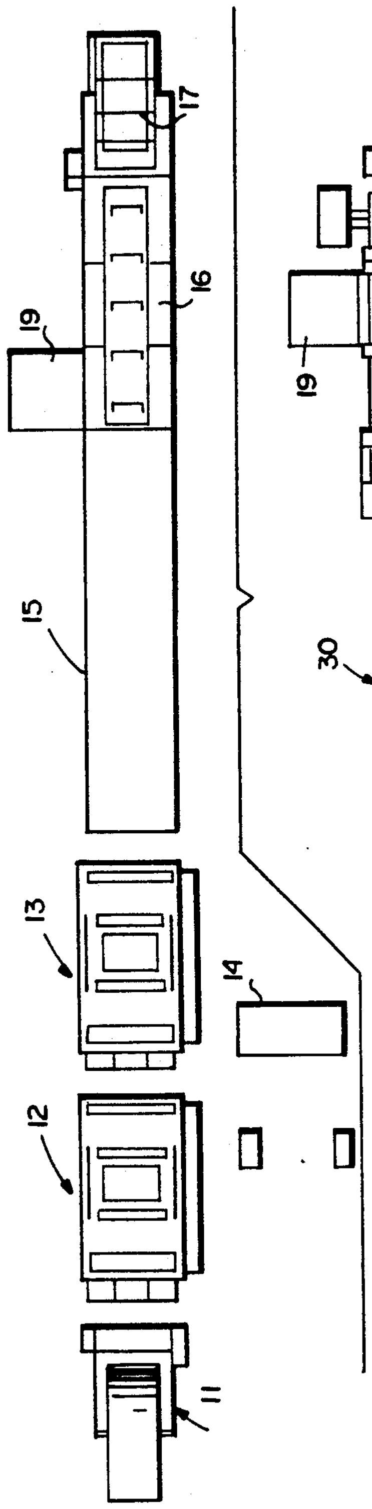
FIG. 4 is a more illustrative view of exemplary apparatus of the system of FIG. 1.

FIG. 4 illustrates slightly more graphically apparatus of the system of FIG. 1, with like reference numbers referring to like components. The imaging systems 12, 13 illustrated in FIG. 4 are low pressure MIDAX 322 print engines. The structure 19 is a Valco cold glue applicator. Alternatively, pressure seal adhesive may be applied at the apparatus 16, and delivered to a sealer (18 in FIG. 1), or after the delivery station 17 the forms may have pressure activated adhesive applied and may be sealed by a Moore Pressure Sealer, which applies sealing pressure to the parts of the multiple part form only at the adhesive strips that are applied adjacent one edge thereof.

FIG. 2 illustrates a system like FIG. 1, only instead of the delivery 17 being provided after the fixed intelligent gather station 16, a conventional forms rotator 21 is provided, operatively associated with a web attacher 22. The forms rotator 21 rotates each document roughly 90° after gathering, and delivers it to the web attacher 22. Typically, the "stub" of the form is rotated so that it leads as it is delivered onto a web attacher 22 on line with the press and imaging system. The web attacher 22 may be a modified Ga-Vehren web attacher which provides a preprinted or blank carrier web and glue system to construct a continuous product where the last sheet is not variably imaged, the carrier web carrying the documents away from the system 10'.

FIG. 3 illustrates a system 10'' which, after the fixed intelligent gatherer 16, has an outer wrapper or envelope front end application unit 24. The modular finishing equipment 24 is placed immediately after the gathering station 16 and provides an imaged outer wrapper or envelope around the multi-part document. The apparatus 24 is known per se. The imaged outer wrapper or envelope is preferably constructed from a web unwound from sonic unwind apparatus 26 or the like, and the imaging system 27 for imaging it may be an ion deposition print engine 27 (the same as the engines 12, 13, and controlled by the controller 14), an ink jet printer, or the like. An optional print engine 28, for the other face of the web from the sonic unwind 26, may also be provided.

While the components for acting on the forms have all been shown in line on FIGS. 1 through 3, the functions can be performed off line too, particularly for the sealer 18, web attacher 22, etc.

Figure 5:
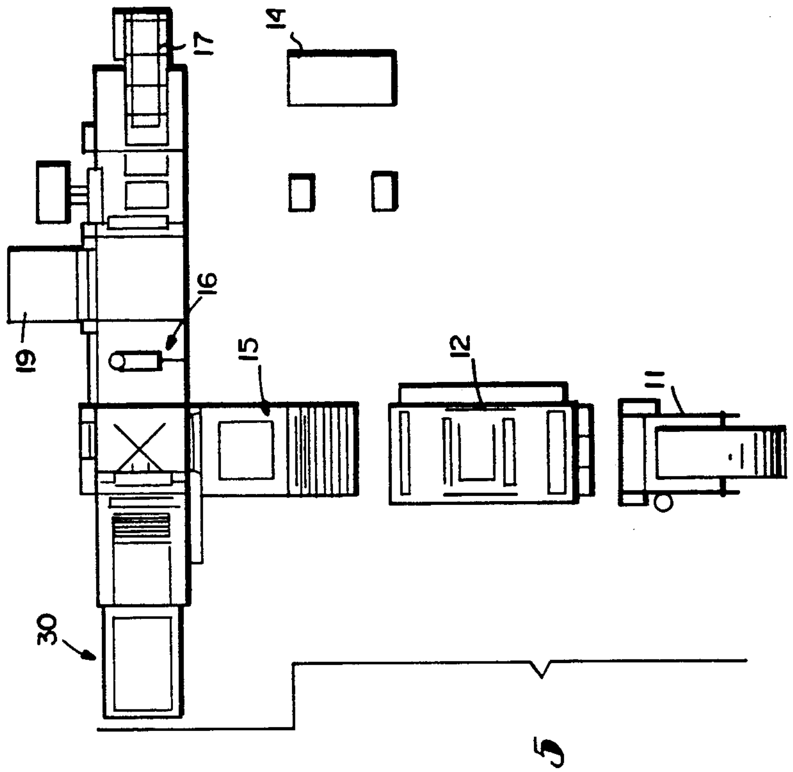
FIG. 5 is an illustration like that of FIG. 4 for an alternative configuration of the system according to the invention.

FIG. 5 is an illustration similar to that of FIG. 4 only for a system like that of FIG. 3 illustrating a Ga-Vehren feeder associated with an envelope front end unit, at 30.

It will thus be seen that according to the present invention an advantageous method of producing multiple part documents where each part has common non-variable information, and at least some parts having variable information such as airbills for courier services with bar coding, is provided, along with a system for making such documents. According to the invention it is possible to manufacture even five and six part forms at a speed of at least 400 fpm, in an efficient manner, requiring only one setup, and with a minimum amount of equipment.

While the invention has been herein shown and described in what is presently conceived to be the most practical preferred embodiment, it will be apparent to those of ordinary skill in the art that many modifications may be made thereof within the scope of the invention, which scope is to be accorded the broadest interpretation of the appended claims so as to encompass all equivalent methods and systems.

What is claimed is:

1. A method of producing multiple part documents, each part having common non-variable information, and at least some parts having variable information, comprising the steps of:

(a) on a continuous web, sequentially printing each part of the multiple part document with common non-variable information;

(b) on the continuous web, sequentially printing variable information on the multiple parts in a procedure distinct from step (a); then (c) separating and intelligently gathering the parts of the multiple part document; and then (d) sealing the multiple parts of each document together along one edge thereof.

2. A method as recited in claim 1 wherein step (b) is practiced by ion deposition printing.

3. A method as recited in claim 2 wherein step (b) is practiced on the web before step (a), the steps being practiced in the order (b), (a), (c), and (d).

4. A method as recited in claim 2 wherein both faces of the web are printed with variable information by ion deposition printing in step (b).

5. A method as recited in claim 1 wherein step (d) is practiced by applying strips of pressure seal adhesive to a common edge of a plurality of the parts of each multiple part document, aligning the adhesive strip edges, and applying pressure to the parts only at the adhesive strips.

6. A method as recited in claim 1 wherein the document has six parts, and the variable information includes bar coding.

7. A method as recited in claim 1 wherein step (a) is practiced utilizing a large diameter plate, having a circumference at least as great as the width or length of a part times the number of parts.

8. A method as recited in claim 1 comprising the further steps, after step (d), of rotating the documents roughly ninety degrees, and delivering the documents to a carrier web to be carried by the carrier web.

9. A method as recited in claim 1 wherein step (a) is practiced utilizing sequential press technology.

10. A method as recited in claim 1 comprising the further step (e), immediately after step (d), of providing an outer wrapper or an envelope around the multiple part documents.

11. A method as recited in claim 10 comprising the further step (f), prior to step (e), of variably imaging the outer wrapper or envelope.

12. A method as recited in claim 11 wherein steps (a) and (f) are practiced by ion deposition printing.

13. A method as recited in claim 1 wherein steps (a)-(d) are practiced at a speed of at least 400 fpm.

14. A printing system for printing multiple part documents having common non-variable information, and variable information, comprising:

web unwinding means for unwinding a paper web having first and second faces;

a single variably imaging print engine for the first face of the web for variably imaging the web after it is unwound by the unwinding means;

means distinct from said variably imaging print engine for sequentially printing on the web first face each part of the multiple part document with non-variable information;

means for separating and intelligently gathering the parts of the multiple part document; and means for sealing the multiple parts of each document together along one edge thereof.

15. A system as recited in claim 14 wherein said variably imaging print engine is disposed between said unwinding means and said sequentially printing means.

16. A system as recited in claim 15 further comprising a single variably imaging print engine for variably imaging the second face of the web, disposed between said unwinding means and said sequentially printing means.

17. A system as recited in claim 14 wherein said variably imaging print engine is an ion deposition print engine.

18. A system as recited in claim 14 wherein said sequentially printing means comprises a printing press having a large diameter plate, with a circumference at least equal to the width or length of each part of the multiple part form being printed times the number of parts.

19. A system as recited in claim 14 further comprising a forms rotator in line with, and downstream of, said separating and intelligently gathering means, and a web attacher in line with, and downstream of, said forms rotator.

20. A system as recited in claim 14 further comprising means for delivering an outer wrapper or envelope to the multiple part documents after said sealing means, and a single ion deposition print engine for printing the outer wrapper or envelope with variable information before delivery thereof to the multiple part documents downstream of said sealing means.

* * * * *